(12) United States Patent
Ghosh et al.

(10) Patent No.: US 7,072,838 B1
(45) Date of Patent: Jul. 4, 2006

(54) METHOD AND APPARATUS FOR IMPROVING HUMAN-MACHINE DIALOGS USING LANGUAGE MODELS LEARNED AUTOMATICALLY FROM PERSONALIZED DATA

(75) Inventors: Debajit Ghosh, Sunnyvale, CA (US); Paul C. Constantinides, San Mateo, CA (US)

(73) Assignee: Nuance Communications, Inc., Burlington, MA (US)

( * ) Notice: Subject to any disclaimer, the term of this patent is extended or adjusted under 35 U.S.C. 154(b) by 439 days.

(21) Appl. No.: 09/813,711

(22) Filed: Mar. 20, 2001

(51) Int. Cl.
*G10L 21/00* (2006.01)
(52) U.S. Cl. ...................... 704/257; 704/277
(58) Field of Classification Search ............ 704/270.1, 704/275, 257, 277
See application file for complete search history.

(56) References Cited

U.S. PATENT DOCUMENTS

| | | | | |
|---|---|---|---|---|
| 5,297,194 | A * | 3/1994 | Hunt et al. | 379/88.02 |
| 5,675,707 | A * | 10/1997 | Gorin et al. | 704/257 |
| 6,073,101 | A * | 6/2000 | Maes | 704/275 |
| 6,173,279 | B1 * | 1/2001 | Levin et al. | 707/5 |
| 6,418,431 | B1 * | 7/2002 | Mahajan et al. | 707/4 |
| 6,529,871 | B1 * | 3/2003 | Kanevsky et al. | 704/246 |
| 6,606,597 | B1 * | 8/2003 | Ringger et al. | 704/270 |
| 6,839,669 | B1 * | 1/2005 | Gould et al. | 704/246 |
| 2002/0055844 | A1 * | 5/2002 | L'Esperance et al. | 704/260 |
| 2002/0184033 | A1 * | 12/2002 | Fitzpatrick et al. | 704/270.1 |

OTHER PUBLICATIONS

Stefan C. Kremmer, Parallel Stochastic Grammar Induction, IEEE, 0-7803-4122-8/97.*
Debajit Ghosh, David Goddeau, "Automatic Grammar Induction from Semantic Parsing," pp. 1-4, Digital Cambridge Research Laboratory, Cambridge, Massachusetts.
Debajit Ghosh, "Automatic Grammar Induction From Semantic Parsing," pp. 1-72, Massachusetts Institute of Technology, Jun. 1998.

* cited by examiner

*Primary Examiner*—Richemond Dorvil
*Assistant Examiner*—Michael N. Opsasnick
(74) *Attorney, Agent, or Firm*—Blakely, Sokoloff, Taylor & Zafman LLP

(57) ABSTRACT

A speech-based processing system includes a database of PIM data of a user, a set of language models, a learning unit, a recognition server, and a speech application. The learning unit uses a language model learning algorithm to provide language models based on the PIM data. The recognition server recognizes an utterance of the user by using one of the language models. The speech application identifies and accesses a subset of the PIM data specified by the utterance by using the recognition result. The language model learning algorithm may use grammar induction and/or or may train statistical language models based on the PIM data. The language model learning algorithm may be applied to generate language models periodically or on-the-fly during a session with the user.

45 Claims, 1 Drawing Sheet

METHOD AND APPARATUS FOR IMPROVING HUMAN-MACHINE DIALOGS USING LANGUAGE MODELS LEARNED AUTOMATICALLY FROM PERSONALIZED DATA

FIELD OF THE INVENTION

The present invention pertains to automatic speech recognition and related technology for allowing dialogs between humans and machines. More particularly, the present invention relates to using personalized data to improve dialogs between a human and a machine.

BACKGROUND OF THE INVENTION

Advances in automatic speech recognition technology are providing more rich and meaningful dialogs between humans and machines in a rapidly-increasing number of applications. Many applications seek to allow rich, meaningful, "open" dialogs in an effort to make dialogs more efficient. "Open" dialogs are dialogs in which the recognition system does not strictly limit what the speaker may say. Open dialogs, however, can be lengthy, tedious and error-prone, due at least in part to imperfect speech recognition accuracy.

Poor recognition accuracy in open dialogs can result from a variety of factors. One common factor is the fact that speakers typically convey information to the recognition system over a lossy speech channel, such as the public switched telephone network. Recognition accuracy also tends to depend on the quality with which expected utterances are modeled; yet speaker utterances can be difficult to predict, especially in applications that are large and open. Further, modeling for open dialogs typically requires a massive amount of training data across a very large number of speakers. As a result, the training process can be difficult and costly.

On the other hand, some applications have sought to simplify dialogs. For example, certain voice portals have provided the ability to derive very simple grammars from an address book. Typically, these grammars are constrained to people's names and addresses for use in voice-activated dialing. These applications generally are not very powerful and are limited in their applicability.

SUMMARY OF THE INVENTION

The present invention includes a method and apparatus for facilitating speech recognition. An automated language model learning process is used to acquire a set of language models based on PIM data associated with a user. An utterance by the user is recognized by using one of the language models, and the recognized utterance is used to identify and access a subset of the PIM data.

Other features of the present invention will be apparent from the accompanying drawings and from the detailed description which follows.

BRIEF DESCRIPTION OF THE DRAWING

The present invention is illustrated by way of example and not limitation in the Figure of the accompanying drawing, in which like references indicate similar elements, and which illustrates a system for carrying out dialogs between a human and a machine by using language models learned automatically from personal information manager (PIM) data.

DETAILED DESCRIPTION

Figure 1:
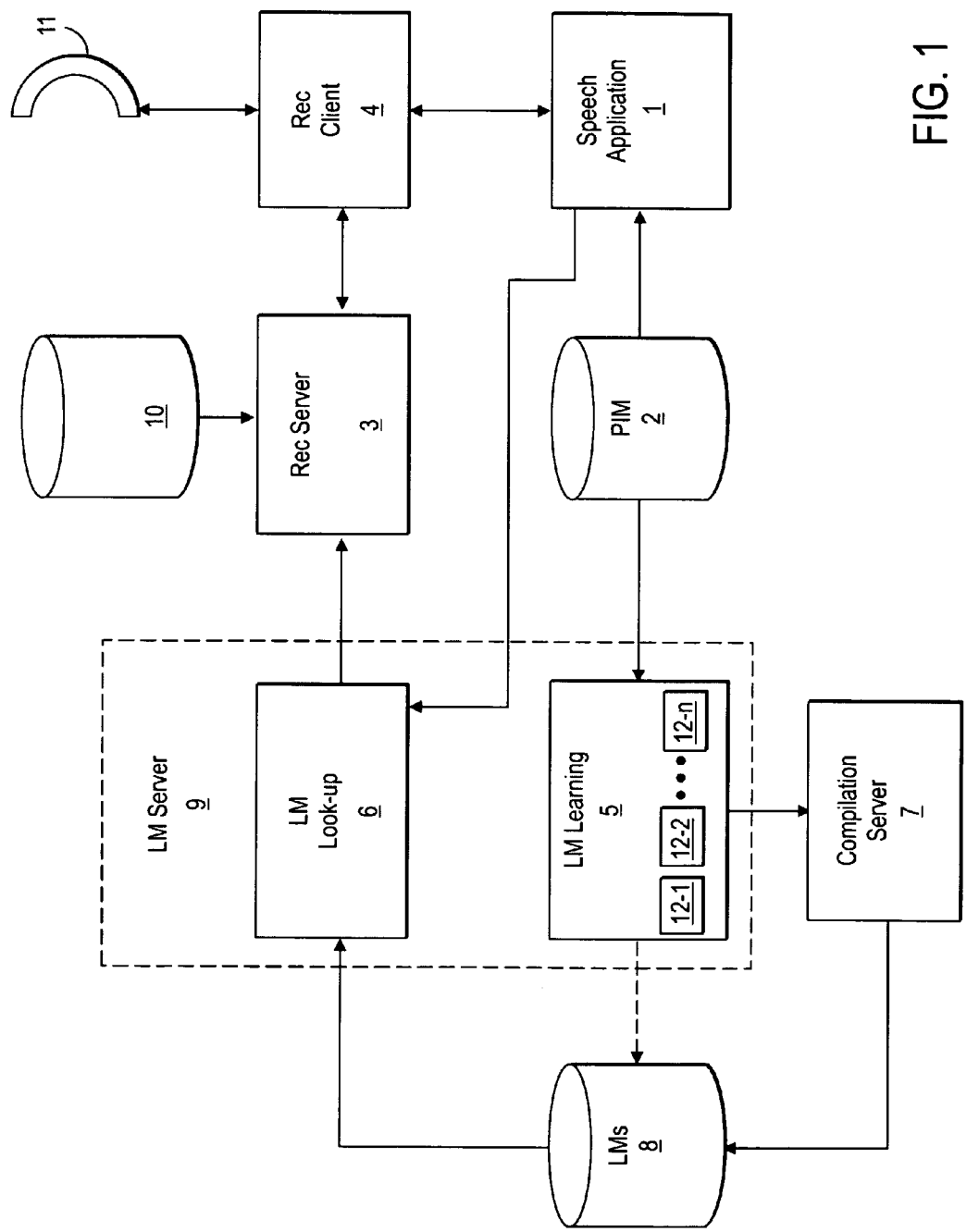

As described in greater detail below, a method and apparatus for improving dialogs between a human and a machine by using language models learned automatically from personalized data are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The technique described herein revolves around the concept of making a personal information manager (PIM) the hub of a speech application. Accordingly, as described in greater detail below, a speech-based processing system according to the present invention includes a database of PIM data of a user, a set of language models, a language model learning/acquisition unit, a language model look-up unit, a recognition server, and a speech application. The learning unit uses a language model learning algorithm to learn language models automatically from the PIM data. During an interaction with the user, the recognition server recognizes a particular utterance of the user by using one of the language models. The speech application uses the recognition result to identify and access a portion of the PIM data specified by the utterance. For example, the utterance "Mike's address" might be recognized using a language model learned from the PIM data and then used as a simple query to look up the address of "Mike Smith" in the user's personal address book. The language models may be, for example, speech recognition grammars and/or statistical language models. Hence, the language model learning algorithm may, for example, use grammar induction and/or train statistical language models, based on the PIM data. In this manner, language models may be acquired periodically, at specified times, or on-the-fly during a session with the user.

The technique described herein promotes optimized dialogs by allowing the speaker to make short references to personal information, rather than having to speak the information in its entirety. Thus, information that is known and central to a user does not have to be conveyed over a speech channel, but rather can be referred to very simply by name or short description, looked up in the underlying PIM database, and passed on to the application that is being used. The technique also promotes improved recognition accuracy by better modeling what is expected to be said. Further, by using readily available information (PIM data), the described technique avoids the traditional problems of requiring massive amounts of training data.

This technique simplifies the problem of data acquisition by focusing on data that is readily available: the personal data in a user's PIM. In addition, this approach can facilitate short dictation tasks corresponding to PIM entry. Dictation traditionally requires a relatively large amount of data. However, by focusing on dictation of entries in the PIM domain, the amount of data required can be reduced to what is readily available. This approach also allows searches through large amounts of personal data to facilitate the location and retrieval of specific entries quickly on demand (e.g., obtaining access to specific e-mail messages or calendar entries in mobile environments).

Examples of the potential uses of this technique include:

speaking the names of people or places in an address book as a source or destination for obtaining driving directions;

speaking the names of people or places to obtain geographically-centered information (e.g., movie listings in an area, traffic reports, or weather);

speaking key words in e-mail subject lines, folder names, etc. to search for particular e-mail messages;

speaking short descriptions of events to search for specific calendar entries (e.g., "Where is my meeting with Joe Smith?" or "When is my next SpeechObjects meeting?");

dictating calendar entries based on the types of tasks a user typically has (e.g., "weekly SpeechObjects meeting, "one-on-one meeting with Joe Smith",); and dictating "to do" tasks (e.g., "pay electric bills").

Certain prior approaches only gather raw, simple name or address grammars from an address book to facilitate very simple applications, such as a voice activated dialing. In contrast, the present invention makes use of grammar induction and/or statistical language model learning/training techniques to enable larger, cross-domain applications that can utilize all PIM data in order to optimize dialogs. In addition, the present invention is designed to be built on top of standard APIs, in contrast with prior approaches.

Refer now to the Figure, which illustrates a system that implements this technique. Note that the Figure shows a logical configuration of the system and is not intended to imply any particular physical architecture. The physical architecture is unimportant for purposes of understanding the present invention. Note also that the illustrated components may be distributed in essentially any manner over one or more networks, such as the Internet, one or more local area networks (LANs), wide area networks (WANs), or a combination thereof. The illustrated system includes a speech application 1, a database 2 containing PIM data associated with a particular user, a recognition server 3, a recognition client 4, a language model (LM) learning unit 5 (hereinafter simply "learning unit"), a language model compilation server 7, a database 8 containing language models, and a language model lookup unit (hereinafter simply "lookup unit") 6. The system also includes an audio interface 11 with the user, and one or more other databases, represented by database 10, storing various other types of data, such as described below. The learning unit 5 and the lookup unit 6 may be packaged together in a language model server 9, as shown in the Figure, although such an implementation is not necessary.

It will be recognized that many of these components can be implemented in software, particularly the speech application 1, the recognition client 4, the recognition server 3, the learning unit 5, the language model lookup unit 6, and the compilation server 7. Accordingly, a software implementation is henceforth assumed in this description to facilitate description. All of the described components may be implemented using conventional hardware, which may include one or more conventional personal computers (PCs), workstations, and/or hand-held computing devices such as personal digital assistants (PDAs) and cellular telephones. However, it is also contemplated that any of the described components may alternatively be implemented, either partially or entirely, in special-purpose hardwired circuitry.

The PIM database 2 may be maintained in a conventional Internet portal site, such as Yahoo! or Excite, hereinafter referred to as the "end integrator". In fact, any or all of the illustrated components may be maintained and operated by a single enterprise, which may be the end integrator.

The data in the PIM database 2 may include, for example, a user's address book, calendar entries, to do list, or e-mail messages, or any combination thereof. It is contemplated that the system will include a separate set of language models and PIM data for each of multiple users having access to the speech application 1. However, the operation of the system will be described herein in terms of one user to simplify explanation. Similarly, the architecture of the illustrated system is highly scalable, in that it may include two or more of any of the illustrated components, to provide improved operation of many users.

The speech application 1 may be any application which makes use of recognized speech of a user to perform its intended operations. The speech application 1 may be based on the use of, for example, Voice XML (extensible markup language) or Nuance SpeechObjects (provided by Nuance Communications of Menlo Park, Calif.). Note that the present invention facilitates and encourages the creation of new types of speech applications designed to make use of references to PIM data.

The recognition client 4 handles interactions between the user, the speech application, and the recognition server. The recognition client 4 handles audio input and output and, if appropriate for the implementation, supports basic telephony control. The recognition client 4 may also perform endpointing of the user' speech received via the audio interface 11. The audio output capability of the recognition client 4 supports the playback of prerecorded prompts to the user via audio interface 11. The recognition client 4 may be, for example, the recognition client of the Nuance Speech Recognition System Version 7.0 ("Nuance 7.0"), available from Nuance Communications of Menlo Park, Calif.

The audio interface 11 may be, for example, a conventional telephony connection. Alternatively, the audio interface may be an Internet Protocol (IP) telephony connection, a local microphone input, or any other type of audio connection.

The recognition server 3 performs speech recognition and natural language understanding of endpointed speech received from the recognition client 4. Optionally, the recognition server 3 may also perform speaker verification. The recognition server 3 may be, for example, the recognition server of Nuance 7.0. To recognize speech and return the natural language interpretation of the spoken utterance, the recognition server 3 uses a set of language models learned from the PIM data, which are stored in the language models database 8. The language models may be, for example, speech recognition grammars and/or statistical language models. The recognition server 3 also uses a dictionary model and a set of acoustic models, user preferences, settings and other data, collectively represented by database 10, the nature of which will be recognized those skilled in the art.

In accordance with the present invention, the learning unit 5 automatically learns, acquires and/or trains (hereinafter simply "learns") language models from the PIM data. The language models may be learned on a periodic basis, at specified times, or on-the-fly (as needed) during a session with the user. The learning process may be initiated when a user registers himself with the end integrator or (if different) the speech application. The learning unit 5 may apply, for example, a grammar induction algorithm to induce grammars based on the PIM data, or it may apply an algorithm for training statistical language models from the PIM data. Grammar induction and training of statistical language models are known to those skilled in the art of automatic speech recognition. Grammar induction is described in, for example, "Automatic Grammar Induction from Semantic Parsing," Master's Degree thesis of Debajit Ghosh, Massachusetts Institute of Technology, June 1998. The training of statistical language models is described in, for example, Frederick Jelinek, "Statistical Methods for Speech Recognition, MIT Press, Cambridge, Mass. (1999).

In one embodiment, the learning unit includes a number (N) of plug-in software libraries ("plug-ins") 12-1 through 12-N. Each of the plug-ins 12-x contains heuristics tailored for learning language models to be used in accessing a specific type of PIM data (e.g., a personal name, a calendar entry, or an e-mail subject line).

In one embodiment, the language models are dynamic grammars. Dynamic grammars are grammars that can be created and/or compiled at runtime. The compilation server 7 is used to convert grammars from their source code (e.g., a grammar scripting language) into a standard node array format used by the recognition server 3; this process may be performed dynamically at runtime. The compilation server 7 may be as provided in Nuance 7.0, for example. Note, however, that the compilation server 7 is an optional component, which may be omitted from embodiments which do not use dynamic grammars. Note also that the language models can be simply stored as one or more files, i.e., they do not have to be stored in a database.

When the user invokes the speech application 1, the lookup unit 6 is triggered by the speech application 1 to identify and retrieve the appropriate language model and to provide the language model to the recognition server 3. To trigger this operation, the speech application 1 indicates to the lookup unit 6 the name of the current user and the type of language model (e.g., to do list) needed for the current task.

As noted above, the learning unit 5 and the lookup unit 6 may be packaged together in a single platform, i.e. a language model server 9, as shown, although such implementation is optional. As one possible alternative, the functionality of the lookup unit 6 may be incorporated into the speech application 1 instead of embodying it as a separate component.

To support the above described functionality, the speech application 1 and the learning unit 5 are written to the same set of application programming interfaces (APIs) for accessing PIM data. These APIs define the interfaces and utility classes to be used in learning the language models from the PIM data, selecting a language model during a user interaction, and accessing the PIM data based on the recognized speech. The APIs may include, for example, the "javax.pim.*" APIs (e.g., javax.pim.addressbook, javax.pim.calendar, and javax.pim.database) described in the JavaPhone API Specification version 1.0, Mar. 22, 2000, and the "javax.mail.*" APIs described in the JavaMail API Design Specification, version 1.1, August 1998, both of which are available from Sun Microsystems of Palo Alto, Calif. Thus, the language models are automatically learned from the PIM data through this set of APIs, and through the same set of APIs, the PIM data is accessed and used by the speech application 1. In addition, the lookup unit 6 is also written to this set of APIs.

In alternative embodiments, the PIM data may be provided in the form of extensible markup language (XML) documents, as specified by a set of XML document type definitions (DTDs). In such embodiments, the speech application 1 and the learning unit 5 do not need to comply with a common set of language-specific APIs. This would allow data to be stored in one standard format that is independent of programming language, such that other parties can access and interpret the data. In either case, the DTDs or the common set of code-based APIs are essentially used to implement a programmatic "contract" between the application developers, end integrators, and speech experts.

Thus, a method and apparatus for improving dialogs between a human and a machine by using language models learned automatically from personalized data have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A speech-based processing system comprising:
   a database of personal information manager data associated with a user;
   a set of language models for use by an automatic speech recognizer to recognize speech;
   a learning unit to provide language models of said set of language models based on the PIM data by employing a language model learning algorithm;
   a recognition server to recognize an utterance of the user by using one of the language models; and
   a speech application to identify and access a subset of the personal information manager data specified by the utterance by using a result of recognizing the utterance.

2. A speech-based processing system as recited in claim 1, wherein the utterance comprises a short reference to said subset of the personal information manager data, said short reference consisting of less than all of said subset of the personal information manager data.

3. A speech-based processing system as recited in claim 1, wherein the learning unit is configured to employ the language model learning algorithm periodically to provide language models based on the personal information manager data.

4. A speech-based processing system as recited in claim 1, wherein the learning unit is configured to employ the language model learning algorithm on-the-fly to provide a language model based on the personal information manager data during a session with the user.

5. A speech-based processing system as recited in claim 1, wherein the language model learning algorithm uses grammar induction.

6. A speech-based processing system as recited in claim 1, wherein the language model learning algorithm trains statistical language models.

7. A speech-based processing system as recited in claim 1, wherein the speech application and the learning unit comply with a common set of APIs designed for accessing personal information manager data.

8. A speech-based processing system as recited in claim 1, wherein the personal information manger data is provided in one or more XML documents.

9. A speech-based processing system as recited in claim 1, wherein the personal information manager data is provided in one or more XML documents.

10. A speech-based processing system as recited in claim 1, wherein the learning unit comprises a plurality of modules, each module containing a set of heuristics tailored for acquiring language models for one of a plurality of types of personal information manager data.

11. A speech-based processing system as recited in claim 10, wherein the plurality of types of personal information manager data comprises personal address book information.

12. A speech-based processing system as recited in claim 10, wherein the plurality of types of personal information manager data comprises personal calendar information.

13. A speech-based processing system as recited in claim 10, wherein the plurality of types of personal information manger data comprises information from email messages of the user.

14. A speech-based processing system comprising:
a database of personal information manager data associated with a user;
a set of language models for use by an automatic speech recognizer to recognize speech;
means for employing a language model learning process to provide language models of said set of language models based on the personal information manager data;
means for recognizing an utterance of the user based on one of the language models, the utterance comprising a short reference to a subset of the personal information manager data; and
means for identifying and accessing the subset of the personal information manager data specified by the utterance based on a result of recognizing the utterance.

15. A speech-based processing system as recited in claim 14, wherein the means for employing a language model learning process comprises a plurality of modules, each module containing a set of heuristics tailored for acquiring language models for one of a plurality of types of personal information manager data.

16. A speech-based processing system as recited in claim 14, wherein the means for employing a language model learning process comprises means for periodically providing language models based on the personal information manager data.

17. A speech-based processing system as recited in claim 14, wherein the means for employing a language model learning process comprises means for providing a language model based on the personal information manager data on-the-fly during a session with the user.

18. A speech-based processing system as recited in claim 14, wherein the language model learning process uses grammar induction.

19. A speech-based processing system as recited in claim 14, wherein the language model learning process trains statistical language models.

20. A speech-based processing system comprising:
a database of personal information manager data associated with a user;
a set of language models for use by an automatic speech recognizer to recognize speech;
a language model server including
a learning unit to provide the set of language models based on the personal information manager data by employing a language model learning algorithm, and
a look-up unit to look-up and select one of the language models based on a specified identity of the user;
a recognition server to recognize an utterance of the user according to the selected language model; and
a speech application to trigger operation of the look-up unit and to identify and access a subset of the personal information manager data specified by the utterance using a result of recognizing the utterance.

21. A speech-based processing system as recited in claim 20, wherein the utterance comprises a short reference to said subset of the personal information manager data, said short reference consisting of less than all of said subset of the personal information manager data.

22. A speech-based processing system as recited in claim 20, wherein the learning unit comprises a plurality of modules, each module containing a set of heuristics tailored for one of a plurality of types of personal information manager data.

23. A speech-based processing system as recited in claim 20, wherein the learning unit is configured to employ the language model learning algorithm periodically to provide language models based on the personal information manager data.

24. A speech-based processing system as recited in claim 20, wherein the learning unit is configured to employ the language model learning algorithm on-the-fly to provide a language model based on the personal information manager data during a session with the user.

25. A speech-based processing system as recited in claim 20, wherein the language model learning algorithm uses grammar induction.

26. A speech-based processing system as recited in claim 20, wherein the language model learning algorithm trains statistical language models.

27. A speech-based processing system as recited in claim 20, wherein the speech application and the learning unit comply with a common set of APIs for accessing personal information manager data.

28. A speech-based processing system comprising:
processor means for executing software; and
storage means accessible to the processor means for storing software, the storage means having stored therein a learning unit to learn a set of language models for use by an automatic speech recognizer to recognize speech, based on a set of personal information manager data and a speech application to access a subset of the personal information manager data specified by a short reference to said subset uttered by a user, by using a result of recognizing the utterance.

29. A speech-based processing system as recited in claim 28, wherein the learning unit comprises a plurality of modules, each module containing a set of heuristics tailored for acquiring language models for one of a plurality of types of personal information manager data.

30. A method of facilitating speech recognition comprising:
using an automated language model learning process to acquire a set of language models for use by an automatic speech recognizer to recognize speech, based on personal information manager data associated with a user;
recognizing an utterance by the user by using one of the language models; and
using the recognized utterance of the user to identify and access a subset of the personal information manager data.

31. A speech-based processing system as recited in claim 30, wherein the utterance comprises a short reference to said subset of the personal information manager data, said short reference consisting of less than all of said subset of the personal information manager data.

32. A method as recited in claim 30, wherein said using an automated language model learning process comprises using a plurality of modules of the automated language model learning process to acquire the set of language models based on personal information manager data associated with the user, wherein each module contains a set of heuristics tailored for a particular type of personal information manager data.

33. A method as recited in claim 30, wherein said using an automated language model learning process comprises periodically providing language models based on the personal information manager data.

34. A method as recited in claim 30, wherein said using an automated language model learning process comprises providing a language model based on the personal information manager data on-the-fly during a session with the user.

35. A method as recited in claim 30, wherein the language model learning process uses grammar induction.

36. A method as recited in claim 30, wherein the language model learning process trains statistical language models.

37. A method of facilitating speech recognition comprising:
- using an automated language model learning process to acquire a set of language models for use by an automatic speech recognizer to recognize speech, based on personal information manager data associated with a user;
- recognizing an utterance by the user by using one of the language models; and
- using a speech application to identify and access a subset of the personal information manager data based on the recognized utterance.

38. A method as recited in claim 37, wherein the utterance comprises a short reference to said subset of the personal information manager data, said short reference consisting of less than all of said subset of the personal information manager data.

39. A method as recited in claim 38, wherein said using an automated language model learning process comprises using a plurality of modules of the automated language model learning process to acquire the set of language models based on personal information manager data associated with the user, wherein each module contains a set of heuristics tailored for one of a plurality of types of personal information manager data.

40. A method as recited in claim 38, wherein said using an automated language model learning process comprises periodically providing language models based on the personal information manager data.

41. A method as recited in claim 38, wherein said using an automated language model learning process comprises providing a language model based on the personal information manger data on-the-fly during a session with the user.

42. A method as recited in claim 38, wherein the language model learning process uses grammar induction.

43. A method as recited in claim 38, wherein the language model learning process trains statistical language models.

44. A speech-based processing system as recited in claim 38, wherein the automated language model learning process and the speech application are each compliant with a set of APIs for accessing personal information manger data.

45. A speech-based processing system as recited in claim 38, wherein the personal information manager data is provided in one or more XML documents.

* * * * *